(12) United States Patent
Kitora

(10) Patent No.: US 8,139,082 B2
(45) Date of Patent: Mar. 20, 2012

(54) IMAGE PROCESSING APPARATUS AND ITS CONTROL METHOD, AND PROGRAM

(75) Inventor: Masakazu Kitora, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 704 days.

(21) Appl. No.: 11/411,781

(22) Filed: Apr. 27, 2006

(65) Prior Publication Data

US 2006/0244751 A1   Nov. 2, 2006

(30) Foreign Application Priority Data

May 2, 2005   (JP) .................................. 2005-134525

(51) Int. Cl.
*G09G 5/00* (2006.01)

(52) U.S. Cl. ........ 345/619; 345/581; 345/643; 382/232; 358/1.9

(58) Field of Classification Search .................. 715/239; 345/468, 660, 619
See application file for complete search history.

(56) References Cited

U.S. PATENT DOCUMENTS

| | | | |
|---|---|---|---|
| 5,850,504 A | 12/1998 | Cooper et al. ................ 395/117 |
| 6,049,339 A * | 4/2000 | Schiller et al. ................ 345/630 |
| 6,440,254 B1 * | 8/2002 | Rich et al. .................... 156/272.2 |
| 6,456,387 B1 * | 9/2002 | Pardo et al. ................... 358/1.13 |
| 6,728,399 B1 * | 4/2004 | Doll .............................. 382/164 |
| 7,119,807 B2 * | 10/2006 | Matsui .......................... 345/468 |
| 7,483,574 B2 * | 1/2009 | Sasaki .......................... 382/232 |
| 7,636,097 B1 * | 12/2009 | Holloway ..................... 345/619 |
| 7,860,266 B2 * | 12/2010 | Sekiguchi et al. ............ 382/100 |
| 2002/0097417 A1 * | 7/2002 | Chang et al. ................. 358/1.13 |
| 2003/0218764 A1 * | 11/2003 | Ooyama ....................... 358/1.9 |
| 2004/0062522 A1 | 4/2004 | Kitora et al. .................... 386/46 |
| 2004/0263537 A1 * | 12/2004 | Faraday et al. ............... 345/660 |
| 2005/0052464 A1 * | 3/2005 | Okuyama ..................... 345/582 |
| 2005/0185044 A1 * | 8/2005 | Sasaki .......................... 347/239 |
| 2005/0268228 A1 * | 12/2005 | Buser et al. ................... 715/239 |
| 2006/0001679 A1 * | 1/2006 | Hamburg ...................... 345/620 |
| 2006/0103665 A1 * | 5/2006 | Opala et al. .................. 345/619 |
| 2006/0256117 A1 * | 11/2006 | Gegout ......................... 345/473 |
| 2007/0109318 A1 * | 5/2007 | Tuomi .......................... 345/611 |

FOREIGN PATENT DOCUMENTS

EP    0 919 909 A1    6/1999
JP    11-224331    8/1999

* cited by examiner

*Primary Examiner* — Xiao M. Wu
*Assistant Examiner* — Phi Hoang
(74) *Attorney, Agent, or Firm* — Fitzpatrick, Cella, Harper & Scinto

(57) ABSTRACT

When first vector image data is input, whether or not the first vector image data includes a raster image data expression part is determined. The raster image data expression part is converted into second vector image data based on the determination result. Final fourth vector image data is generated based on the converted second vector image data and third vector image data other than the raster image data expression part in the first vector image data.

13 Claims, 15 Drawing Sheets

FIG. 5

C1 : DocumentSetStart
C2 : DocumentSize(A4)
C3 : DocumentDirection(PORT)
C4 : DocumentType(Page)
C5 : DocumentSetEnd
} 501

C6 : PageStart
C7 : Font{1}
C8 : FontSize{10}
C9 : FontColor{0,0,0}
C10 : Position{10,5}
C11 : String{XXXX···YY···}
} 502

C12 : FillColor{128,64,35}
C13 : LineColor{255,92,128}
C14 : Position{40,300}
C15 : ArcRadius{10}
C16 : CloseArc{0,90}
C17 : FillColor{62,35,200}
C18 : LineColor{10,40,80}
C19 : Position{400,300}
C20 : ArcRadius{10}
C21 : CloseArc{90,360}
C22 : PageEnd
} 503

FIG. 6

C1 : DocumentSetStart  
C2 : DocumentSize(A4)  
C3 : DocumentDirection(PORT)  
C4 : DocumentType(Page)  
C5 : DocumentSetEnd  
⎫ 601

C6 : PageStart  
C7 : IMAGE_TYPE{RGB}  
C8 : Position{0,0}  
C9 : WIDTH_HIGHT{1000,1000}  
C10 : RRRRRRR...  
C11 : RRRRRRR...  
·  
·  
C42 : GGGGGGG...  
C43 : GGGGGGG...  
·  
·  
C74 : BBBBBBBB...  
C75 : BBBBBBBB...  
·  
·  
C106 : PageEnd  
⎫ 602

FIG. 8

BLOCK INFORMATION

| | ATTRIBUTE | COORDINATE X | COORDINATE Y | WIDTH W | HEIGHT H |
|---|---|---|---|---|---|
| BLOCK 1 | 1 | X1 | Y1 | W1 | H1 |
| BLOCK 2 | 3 | X2 | Y2 | W2 | H2 |
| BLOCK 3 | 2 | X3 | Y3 | W3 | H3 |
| BLOCK 4 | 1 | X4 | Y4 | W4 | H4 |
| BLOCK 5 | 3 | X5 | Y5 | W5 | H5 |
| BLOCK 6 | 5 | X6 | Y6 | W6 | H6 |

* ATTRIBUTE  1 : text  2 : picture  3 : table  4 : line  5 : photo

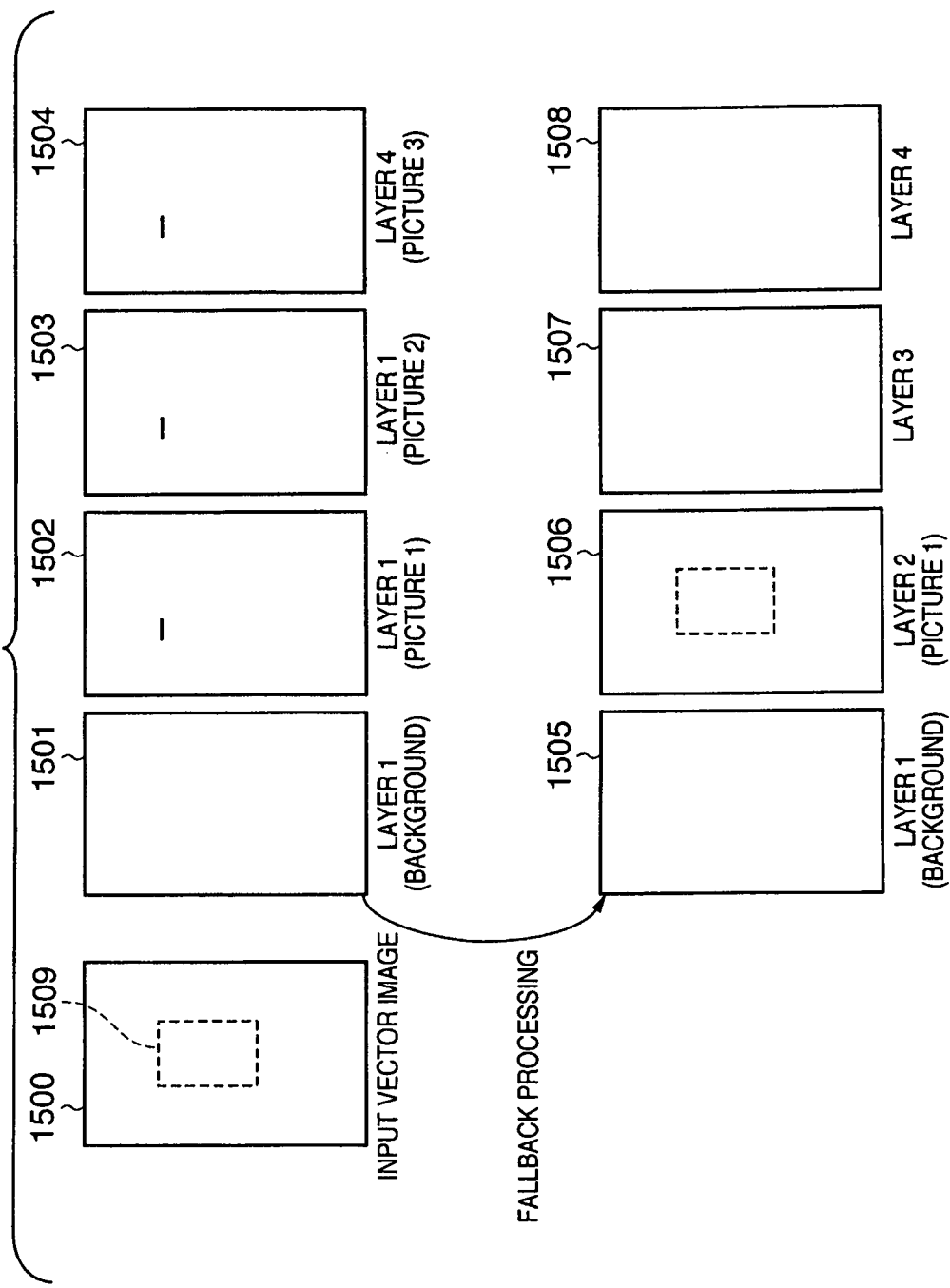

IMAGE PROCESSING APPARATUS AND ITS CONTROL METHOD, AND PROGRAM

FIELD OF THE INVENTION

The present invention relates to an image processing apparatus which applies image processing to input image data and manages the processed image data and its control method, and a program.

BACKGROUND OF THE INVENTION

An image data input/output system which is connected to a network, applies image data processing to external or internal image data, and outputs the processed image data, is known.

As this image data input/output system, a so-called MFP (Multi Function Peripheral) is available.

FIG. 2 shows a controller 100 for controlling the conventional MFP. In the controller 100, a CPU 102, memory controller (MC) 103, general-purpose bus 105, image processing unit 112, and image data rasterization unit (RIP (Raster Image Processor)) 115 are connected via a system bus bridge (SBB) 101.

To the general-purpose bus 105, a hard disk controller (HDDCont) 106 for controlling an HDD (hard disk drive) 107 used to store image data, and a console controller 108 for controlling a console (e.g., a touch panel comprising an LCD and the like) 109 are connected. Furthermore, to the general-purpose bus 105, a network I/F 110 which serves as an interface for transferring image data with an external device via a network 111, to which the MFP is connected, is connected. As this image data, image data of a page vector format (PDL (page description language), PDF, SVG, and the like) is used.

To the HDDCont 106, the HDD (hard disk drive) 107 is connected and is used as a storage medium of image data. Likewise, to the MC 103, a system memory (Memory) 104 is connected and is used as a medium for temporarily storing image data. As the system memory 104, a DIMM is normally used.

To the image processing unit 112, a scanner 113 and printer 114 are connected. Image data input from the scanner 113 undergoes predetermined image processing by the image processing unit 112, and is then input to the controller 100. Image data stored in the controller 100 undergoes predetermined image processing by the image processing unit 112, and is output to the printer 114.

Upon handling image data by the controller 100, data input/output to/from an external device via the network are interfaced in a page vector format (PDL, PDF, SVG, etc.), and data input/output to/from the scanner 113 and printer 114 are interfaced in a raster data format. Image data in the page vector format input from the external device is interpreted to primitive objects by the CPU 102 to be converted into intermediate data called DL (DisplayList), and the intermediate data is input to the RIP 115.

Since these image data are temporarily stored in the system memory 104 in the controller 100, many kinds of data such as raster data, page vector data (PDL, etc.), DL data, and the like exist on the system memory 104.

The HDD 107 stores image data input from the scanner 113 and raster image data rendered by the RIP 115 as image data.

Of image data to be handled by this MFP, bitmap image data has a large data size. For this reason, the bitmap image data consumes many system resources such as the memory size of the system memory 104, the bandwidth among the general-purpose bus 105, HDDCont 106, and HDD 107, and the like. The processing speed of the system demanded by the user is increasing year by year, and system resources required to meet such demands are ballooning.

Hence, an image compressor/decompressor is prepared in the image processing unit 112 or the RIP 115, and image compression processing such as JPEG or the like is applied to raster image data input from the scanner 113 and bitmap image data described in PDL data. In this way, a system which reduces the load on the system resources is proposed (for example, Japanese Patent Laid-Open No. 11-224331).

Meanwhile, users recently require higher image quality of output images. As one of solutions to such requirements, a high-resolution technology (high-image quality technology) for image data has been promoted. When the aforementioned image compression processing such as JPEG or the like is applied to such high-quality image data to suppress the load cost on the system resources, deterioration of image quality occurs. For this reason, improvement of a compression ratio by the image compression processing and the high-image quality technology normally have a tradeoff relationship. Hence, it is required to suitably attain these two objects at the same time.

Vector conversion for converting a scan image (raster image) into a vector image (image data in the vector format) is one method of solving this problem. For example, a raster image/vector image conversion processing unit is incorporated in the image processing unit 112 in the prior art shown in FIG. 2 to convert a raster image into a vector image.

With this vector conversion, a raster image scanned by the scanner is processed so that a text part is converted into character codes or outline data, straight lines and curves of a thin line image, illustration, and the like are converted into functions, and a table and the like are processed as table data. Hence, high image quality can be attained in text and thin line reproduction.

Since image data is converted into codes or functions, the file size to be stored becomes very small. Upon executing a data transmission function, the time required for transmission can be shortened since the file size is small. In addition, the load on the system resources is reduced.

A system in which the image processing unit 112 incorporates the raster image/vector image conversion processing unit can contribute to a data size reduction and high image quality of a scan image, but it does not provide any contribution to image data received from the network 111. Normally, image data received from the network 111 is image data in the vector format, which includes data obtained by pasting an image separately scanned by a scanner by an image processing application on a terminal such as a personal computer or the like. An image of such type is the same as a raster image, since its entity is not converted into character codes or functions, although it is called image data in the vector format.

Some types of picture drawing applications output a bitmap (raster) image by converting objects (text, image, and the like). For these images, a method of reducing the system resources as in a scan image remains as a problem.

SUMMARY OF THE INVENTION

The present invention has been made to solve the above problems, and has as its object to provide an image processing apparatus and its control method, and a program, which can ease limitations on the system resources of the entire system.

According to the present invention, the foregoing object is attained by providing an image processing apparatus comprising:

input means for inputting image data;

determination means for, when first vector image data is input from the input means, determining whether or not the first vector image data includes a raster image data expression part;

conversion means for converting the raster image data expression part into second vector image data based on a determination result of the determination means; and generation means for generating fourth vector image data, based on the second vector image data converted by the conversion means, and third vector image data other than the raster image data expression part in the first vector image data.

In a preferred embodiment, the apparatus further comprises:

storage means for storing the fourth vector image data generated by the generation means;

rasterization means for rasterizing the fourth vector image data stored in the storage means into raster image data; and output means for outputting the raster image data rasterized by the rasterization means to an image output unit.

In a preferred embodiment, the apparatus further comprises:

a driver for receiving the first vector image data from an application and outputting the fourth vector image data to an image processing system, and in that the driver implements the input means, the conversion means, and the generation means.

In a preferred embodiment, the input means inputs the first vector image data received from an external device via a network.

In a preferred embodiment, the apparatus further comprises:

intermediate data generation means for generating intermediate data required to generate raster image data for respective objects which form the fourth vector image data generated by the generation means;

rasterization means for, when a storage area required to temporarily store intermediate data generated by the intermediate data generation means in a storage unit cannot be assured, rasterizing already generated intermediate data stored in the storage unit to raster image data;

second conversion means for converting the raster image data rasterized by the rasterization means into vector image data; and control means for controlling the intermediate data generation means to generate intermediate data of the vector image data converted by the second conversion means, and controlling the storage unit to store the generated intermediate data of the vector image data converted by the second conversion means in place of the already generated intermediate data.

In a preferred embodiment, the rasterization means rasterizes intermediate data having an identical attribute of the already generated intermediate data, stored in the storage unit, into raster image data.

In a preferred embodiment, the apparatus further comprises:

designation means for designating whether or not a raster image data expression part included in vector image data to be processed is to be converted into vector image data.

According to the present invention, the foregoing object is attained by providing an image processing apparatus comprising:

input means for inputting vector image data;

intermediate data generation means for generating intermediate data required to generate raster image data for respective objects which form the vector image data input from the input means;

rasterization means for, when a storage area required to temporarily store intermediate data generated by the intermediate data generation means in a storage unit cannot be assured, rasterizing already generated intermediate data stored in the storage unit to raster image data;

conversion means for converting the raster image data rasterized by the rasterization means into vector image data; and control means for controlling the intermediate data generation means to generate intermediate data of the vector image data converted by the conversion means, and controlling the storage unit to store the generated intermediate data of the vector image data converted by the conversion means in place of the already generated intermediate data.

In a preferred embodiment, the rasterization means rasterizes intermediate data having an identical attribute of the already generated intermediate data, stored in the storage unit, into raster image data.

According to the present invention, the foregoing object is attained by providing a method of controlling an image processing apparatus, the method comprising:

an input step of inputting image data;

a determination step of determining, when first vector image data is input in the input step, whether or not the first vector image data includes a raster image data expression part;

a conversion step of converting the raster image data expression part into second vector image data based on a determination result in the determination step; and a generation step of generating fourth vector image data, based on the second vector image data converted in the conversion step, and third vector image data other than the raster image data expression part in the first vector image data.

According to the present invention the foregoing object is attained by providing a method of controlling an image processing apparatus, the method comprising:

an input step of inputting vector image data;

an intermediate data generation step of generating intermediate data required to generate raster image data for respective objects which form the vector image data input in the input step;

a rasterization step of rasterizing, when a storage area required to temporarily store intermediate data generated in the intermediate data generation step in a storage unit cannot be assured, already generated intermediate data stored in the storage unit to raster image data;

a conversion step of converting the raster image data rasterized in the rasterization step into vector image data; and a control step of controlling to generate intermediate data of the vector image data converted in the conversion step, and controlling the storage unit to store the generated intermediate data in place of the already generated intermediate data.

According to the present invention the foregoing object is attained by providing a program for making a computer execute control of an image processing apparatus, comprising:

an input step of inputting image data;

a determination step of determining, when first vector image data is input in the input step, whether or not the first vector image data includes a raster image data expression part;

a conversion step of converting the raster image data expression part into second vector image data based on a determination result in the determination step; and a generation step of generating fourth vector image data based on the second vector image data converted in the conversion step, and third vector image data other than the raster image data expression part in the first vector image data.

According to the present invention the foregoing object is attained by providing a program for making a computer execute control of an image processing apparatus, comprising:

an input step of inputting vector image data;

an intermediate data generation step of generating intermediate data required to generate raster image data for respective objects which form the vector image data input in the input step;

a rasterization step of rasterizing, when a storage area required to temporarily store intermediate data generated in the intermediate data generation step in a storage unit cannot be assured, already generated intermediate data stored in the storage unit to raster image data;

a conversion step of converting the raster image data rasterized in the rasterization step into vector image data; and a control step of controlling to generate intermediate data of the vector image data converted in the conversion step, and controlling the storage unit to store the generated intermediate data in place of the already generated intermediate data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 shows a description example of vector image data according to the first embodiment of the present invention;

FIG. 6 shows an example of vector image data including a description of raster image data according to the first embodiment of the present invention;

FIG. 8 shows an example of block information according to the first embodiment of the present invention;

FIG. 15 is a view for explaining fallback processing including raster/vector conversion processing according to the fourth embodiment of the present invention.

DETAILED DESCRIPTION OF THE PREFERRED EMBODIMENTS

Preferred embodiments of the present invention will now be described in detail in accordance with the accompanying drawings.

First Embodiment

[Apparatus Overview of MFP]

Figure 1:
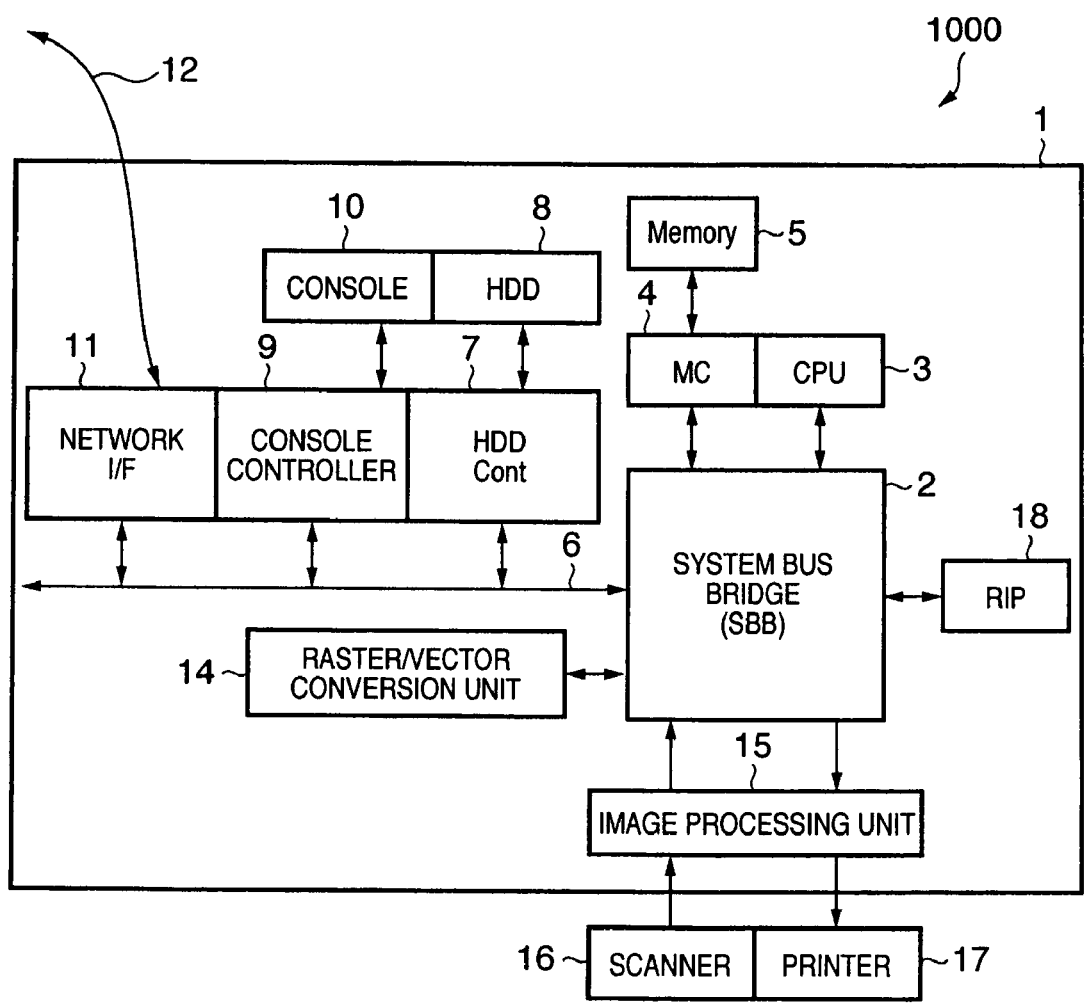
FIG. 1 is a block diagram showing details of a controller for an MFP which forms an image processing system according to the first embodiment of the present invention.
Figure 2:
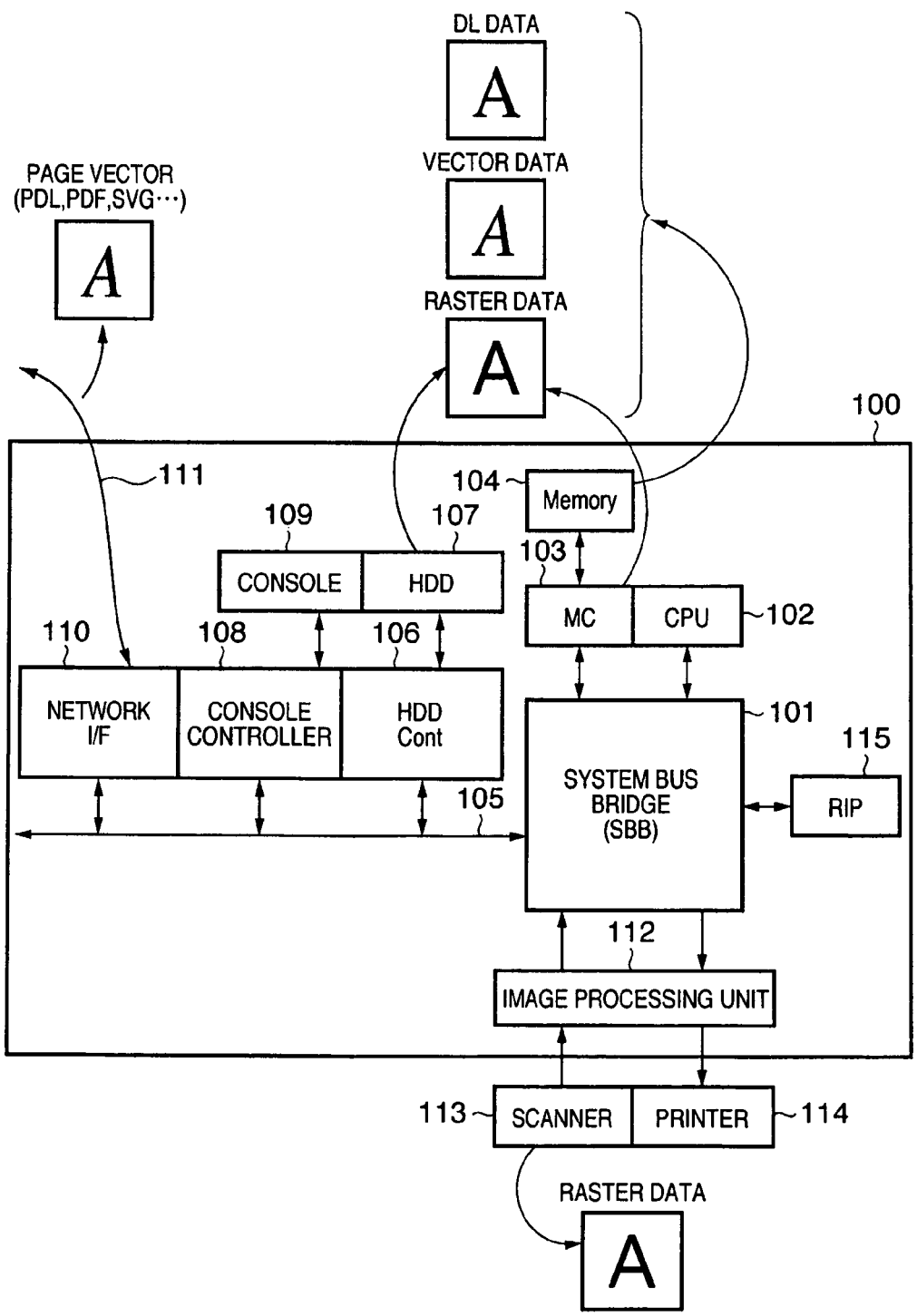
FIG. 2 is a block diagram showing the arrangement of a conventional image processing system.

FIG. 1 is a block diagram showing details of a controller for an MFP which forms an image processing system according to the first embodiment of the present invention.

In a controller 1 for controlling an MFP 1000, a CPU 3, memory controller (MC) 4, general-purpose bus 6, raster/vector conversion unit 14, image processing unit 15, and image data rasterization unit (RIP) 18 are connected via a system bus bridge (SBB) 2.

To the MC 4, a system memory (Memory) 5 is connected and is used as a medium for temporarily storing image data.

To the general-purpose bus 6, a hard disk controller (HDD-Cont) 7 for controlling an HDD (hard disk drive) 8 used to store image data, and a console controller 9 for controlling a console (e.g., a touch panel comprising an LCD and the like) 10 are connected. Furthermore, to the general-purpose bus 6, a network I/F 11 which serves as an interface for transferring image data with an external device via a network 12, to which the MFP 1000 is connected, is connected.

Note that the console 10 allows to input execution instructions of various kinds of processing of the first embodiment (to be described later), and displays an operation screen used to display operation results and the like. The user can implement various operations via this operation screen.

To the image processing unit 15, a scanner 16 and printer 17 are connected. Upon handling image data by the controller 1, data input/output to/from an external device are interfaced as image data in a vector format (PDL, PDF, SVG, etc.) (to be also referred to as vector image data hereinafter), and data input/output to/from the scanner 16 and printer 17 are interfaced as image data in a raster data format (to be also referred to as raster image data hereinafter).

[Data Flow Upon Printing]

Figure 3:
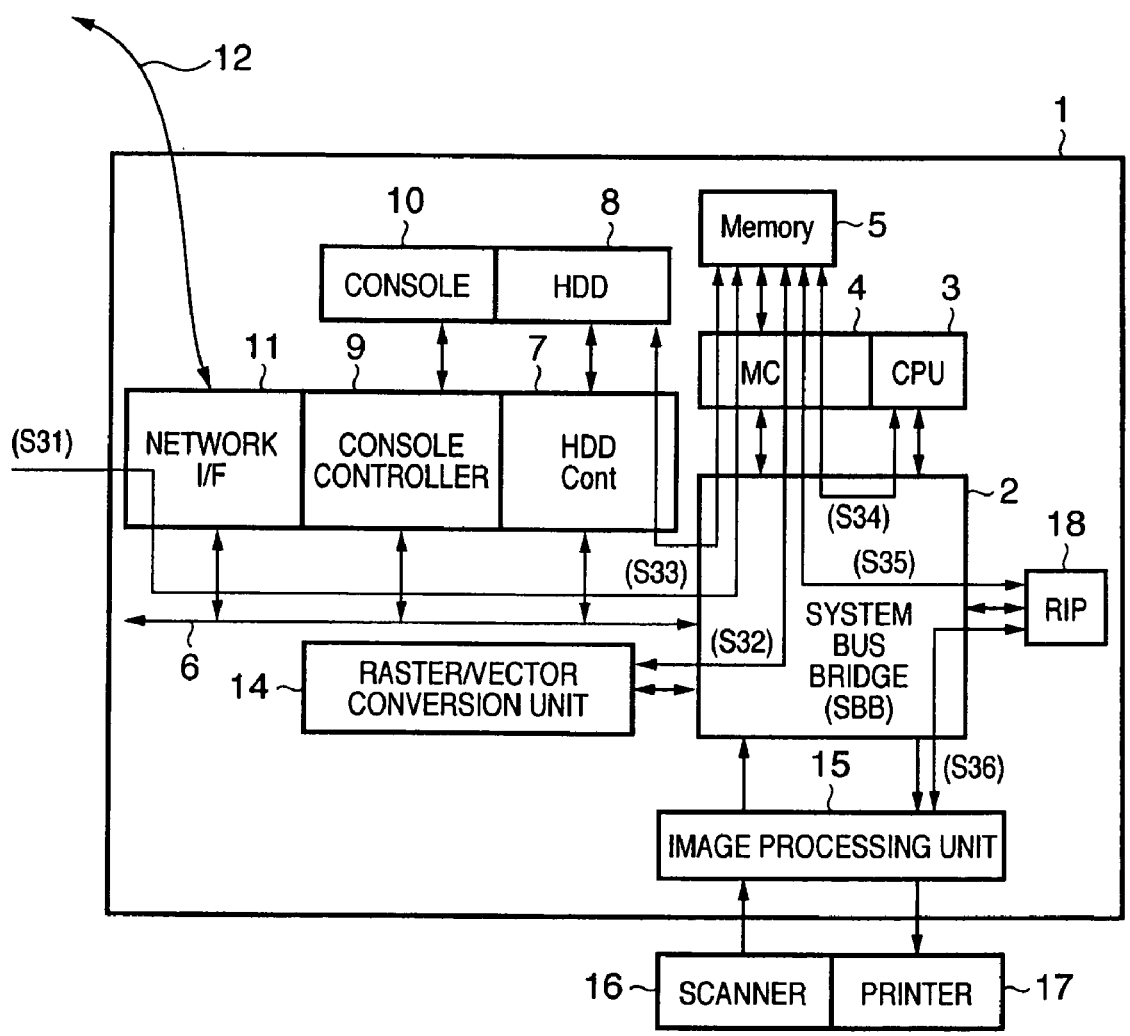
FIG. 3 is a diagram showing the processing flow upon printing data transferred from a network in the image processing system according to the first embodiment of the present invention.

FIG. 3 is a diagram showing the processing flow upon printing data transferred from the network in the image processing system according to the first embodiment of the present invention.

Note that this processing flow is implemented by operating respective building components which form the MFP in collaboration with each other under the control of the CPU 3.

(S31): The network I/F 11 connected to the general-purpose bus 6 receives vector image data from an external device connected to the network 12. The network I/F 11 transfers the received data to the system memory 5 via the MC 4 connected to the SBB 2.

(S32): The vector image data stored in the system memory 5 is read out by the MC 4, and is transferred to the raster/vector conversion unit 14 via the SBB 2.

The raster/vector conversion unit 14 determines whether or not the vector image data received from the network 12 includes a raster image data expression.

If the raster image data expression is included, the raster/vector conversion unit 14 executes vector conversion processing for converting the raster image data expression into vector image data, and writes back the converted vector data to the system memory 5 via the SBB 2 and MC 4.

On the other hand, if no raster image data expression is included, the raster/vector conversion unit 14 writes back the vector image data to the system memory 5 via the SBB 2 and MC 4 intact.

By executing the processing of the raster/vector conversion unit 14, the data size of image data received from the network 12 can be reduced. Since character code conversion, function conversion, and the like are applied to that image data, its image quality drop can be prevented. Details of this raster/vector conversion processing will be described later.

(S33): The vector image data which is written back to the system memory 5 is stored in the HDD 8 under the control of the HDDCont 7 connected to the general-purpose bus 6 via the SBB 2. By storing the vector image data in the HDD 8, that data can be output by changing its page order or it can be stored in the MFP 1000 as saved document data.

The vector image data stored in the HDD 8 is read out again by the HDDCont 7 in synchronism with the timing of a printer ready signal sent from a CPU (not shown) in the printer 17, and is temporarily stored in the system memory 5 via the SBB 2 and MC 4.

When the readout vector image data is directly output from the HDD 8 to the printer 17, it cannot often be guaranteed to output that data in synchronism with the printer 17 due to insufficient access speed of the HDD 8 and the degree of traffic congestion on the general-purpose bus 6. For this reason, before data transfer in synchronism with the printer 17, the vector image data for one page is spooled in the system memory 5, thus guaranteeing a real-time throughput.

(S34): The vector image data stored in the system memory 5 is read out via the SBB 2 and MC 4 under the control of the CPU 3, which interprets commands that describe respective objects of the vector image data. As a result of interpretation, the vector image data is converted into intermediate data called DL (DisplayList) data which represents rendering objects, and the converted data is written back to the system memory 5.

If the vector image data includes a raster image data expression, the raster image data expression is not converted into intermediate data and is written back to the system memory 5 as raster image data, thus requiring a large memory size. However, according to the present invention, since raster image data can be minimized in S32, consumption of the memory size can be reduced compared to the conventional system.

(S35): The DL data spooled in the system memory 5 is transmitted to the RIP 18 via the MC 4 and SBB 2 in response to an activation signal sent from the printer 17. The RIP 18 renders the DL data into raster image data, which is transferred to the image processing unit 15 via the SBB 2.

(S36): The raster image data generated by the RIP 18 is transferred to the image processing unit 15, and undergoes, e.g., the following processes.

1) Correction processing of colors and densities of an output image in correspondence with the printer characteristics 2) Tone conversion processing for performing tone conversion of an output image by quantizing image data 3) Frequency conversion processing required to output an image in synchronism with printer I/F clocks The raster image data which has undergone the image processes 1) to 3) in the image processing unit 15 is transferred to the printer 17, and is printed out onto a printing medium.

[Raster/Vector Conversion Unit]

Details of the processing of the raster/vector conversion unit 14 will be described below.

Figure 4:
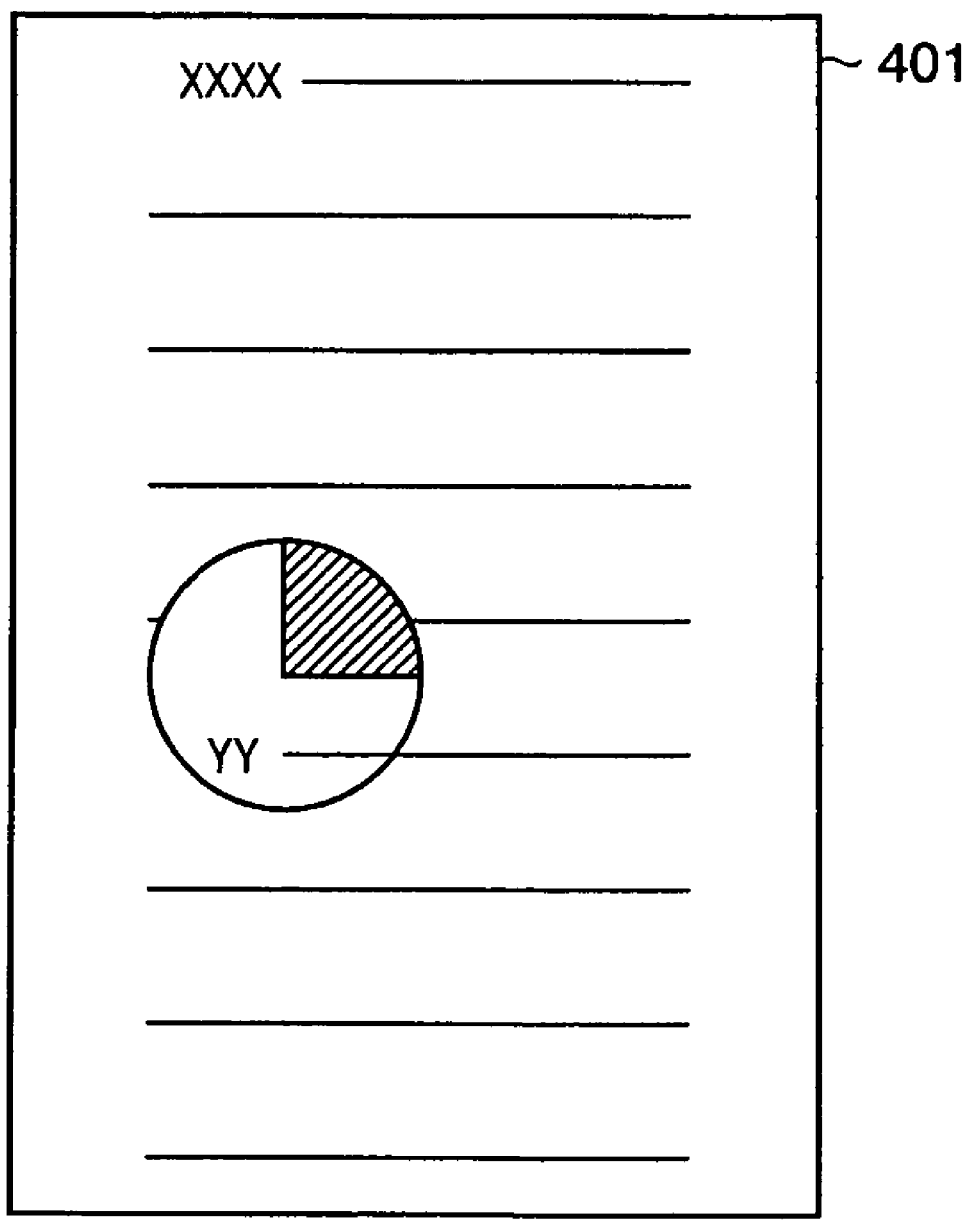
FIG. 4 shows an example of document data transferred from the network according to the first embodiment of the present invention.

FIG. 4 shows an example of the document data transferred from the network according to the first embodiment of the present invention.

In FIG. 4, the widthwise direction of the document data is defined as an "X" direction, and its longitudinal direction is defined as a "Y" direction. Document data 401 may include one of vector image data, vector image data including a raster image data expression, and raster image data.

A description example of the contents of the document data 401 when it is vector image data will be described below using FIG. 5.

FIG. 5 shows a description example of vector image data according to the first embodiment of the present invention.

Referring to FIG. 5, reference numeral 501 denotes a document setting command part associated with the settings of the entire document data; 502, a text drawing command part; and 503, a picture drawing command part.

Details of the respective drawing command part will be described below.

In the document setting command part 501, reference numerals C1 to C5 denote commands associated with the entire document. Therefore, each of these commands C1 to C5 is assigned to only one position per copy of a document.

These commands associated with the entire document data include, e.g., a character set command (font designation command), a scalable font command (a command used to designate whether or not a scalable font is used), a hard reset command (a command used to reset an old printer use environment), and the like.

Note that C1 is a document setting start command. C2 is a command used to indicate the output paper size of document data. In this case, "A4" is set. C3 is a command used to indicate the orientation of the document data. As the orientation of the document data, portrait and landscape are available, and portrait (PORT) is indicated in this case.

C4 is a command used to indicate the type of document data, i.e., whether document data is formed of page vector data or tile vector data. In this case, page (PAGE) is set. C5 is a document setting end command.

C6 to C22 of the text drawing command part 502 and picture drawing command part 503 are various commands required to output document data.

C6 is a command used to indicate the start of a page. C7 is a command used to select the type of text font. In this case, a font set with the number "1" is selected. C8 is a command used to set the font size. In this case, the size of "10 points" is selected.

C9 is a command used to set a text color, and to indicate luminance values of respective color components R (red), G (green), and B (blue) in turn. This luminance value is quantized to, e.g., 256 levels ranging from 0 to 255. In this case, (0, 0, 0) is set. C10 is a command used to indicate the coordinates of the text drawing start position. A coordinate position (X, Y) is designated to have the upper left corner of a page as an origin. In this case, the command is set to start text drawing from a position {10, 5} of the page. C11 is a command used to indicate a character string (XXXX . . . YY . . . ) to be actually drawn.

C12 is a command used to indicate a paint color of a plane upon picture drawing. The color can be designated in the same manner as the text color. C13 is a command used to designate a line color of picture drawing. C14 is a command used to indicate the coordinates of a picture drawing position.

C15 is a command used to designate the radius upon drawing an arc. In this case, the command indicates a "10" coordinate unit. C16 is a command used to draw a closed arc. Two parameters in the command respectively indicate the drawing start angle and end angle upon drawing an arc. Vertical information is set to 0°, and the command indicates that an arc ranging from 0° to 90° is to be drawn in this case.

C17 to C21 are commands used to designate the plane and line colors, position, and the like upon picture drawing. C22 is a command used to indicate the end of the page.

On the other hand, a description example of the contents of the document data 401 when it is vector image data including a description of raster image data (image data handled as raster image data depending on the description contents of vector image data) will be described below using FIG. 6.

FIG. 6 shows an example of vector image data including a description of raster image data.

Referring to FIG. 6, reference numeral 601 denotes a document setting command part associated with settings of the entire document data; and 602, a drawing command part of raster image data.

Note that the document setting command part 601 is the same as the document setting command part 501 in FIG. 5.

In the raster image data drawing command part 602, C6 to C106 are commands required to output raster image data.

C6 is a command used to indicate the start of a page. C7 is a command used to indicate the type of raster image data. In this case, this command indicates that the document data 401 is raster image data expressed by "RGB". C8 is a command used to indicate the start position of raster image data. In this case, since the entire page of the document data is raster image data, this command indicates an origin {0, 0}.

C9 is a command used to indicate the size of raster image data: WIDTH indicates the number of pixels in the X-direction, and HIGHT indicates the number of pixels in the Y-direction. In this case, the command indicates an image having 1000 pixels in the X-direction, and 1000 pixels in the Y-direction.

C10 to C75 are commands used to indicate RGB values of respective pixels. These commands form a data stream which is described in the order in which the coordinate position advances in the X-direction first from the start position of the raster image data, and when the last coordinate position in the X-direction is reached, the coordinate position in the Y-direction advances. In this case, an RGB page-sequential scan description that forms the raster image data is adopted as follows. That is, an R data stream is described first. Upon completion of a description of R, a G data stream is described. Upon completion of a description of G, a B data stream is described. Of course, the description order is not limited to such specific order. A different coordinate scan method may be used, or a point-sequential scan description that scans RGB values for respective pixels may be used.

As can be seen from comparison between FIGS. 5 and 6, when raster image data is described in vector image data, the total description amount that indicates the contents of the data increases, thus increasing a data size. Therefore, the raster/vector conversion unit 14 performs vector conversion of a description part corresponding to raster image data in the input vector image data.

For example, when a description corresponding to the raster image data includes a text image and table image, vector image data corresponding to the text image and table image can be generated. That is, in case of a text image, corresponding vector image data (character code or outline data of a character) can be generated. Also, in case of a table image, corresponding vector image data (vector data indicating the ruled lines that form a table) can be generated.

Next, the processing flow of the raster/vector conversion unit 14 will be described below using FIG. 7.

Figure 7:
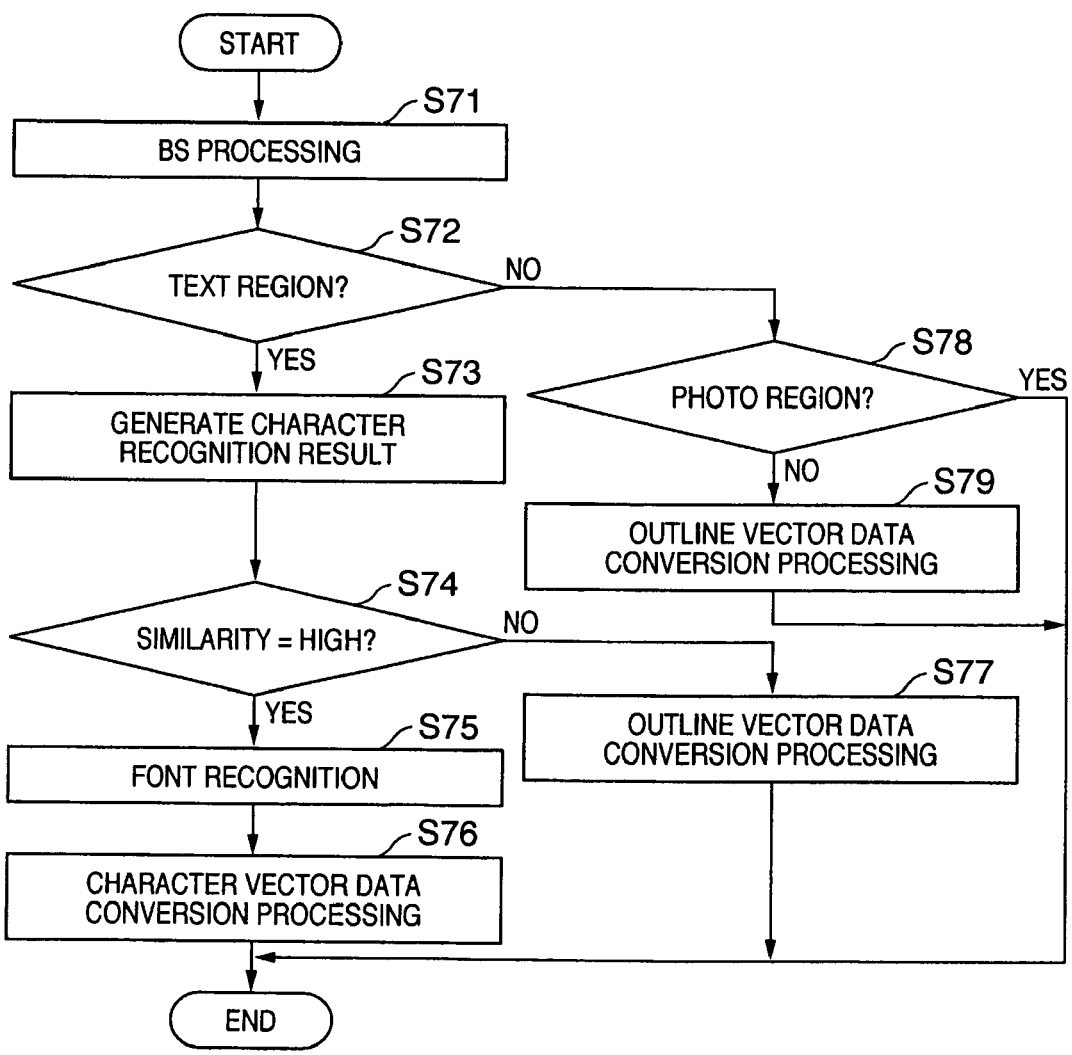
FIG. 7 is a flowchart showing the processing flow of a raster/vector conversion unit according to the first embodiment of the present invention.

FIG. 7 is a flowchart showing the processing flow of the raster/vector conversion unit according to the first embodiment of the present invention.

(Step S71 Block Selection (BS) Processing):

Raster image data (e.g., C10 to C75 in FIG. 6) of a part which describes image data is extracted from vector image data transferred from the system memory 5. The extracted raster image data is segmented into regions (objects) such as a text/line region including characters or line images, a halftone photo region, an image region with an indeterminate shape, and the like.

Furthermore, the text/line region is segmented into a text region mainly including characters and a line region mainly including a table, picture, and the like. The line region is segmented into a table region and picture region.

Note that the first embodiment detects connected pixels, and segments image data into regions of respective attributes using feature amounts such as the shapes, sizes, pixel densities, and the like of circumscribed rectangular regions of the connected pixels. However, other region segmentation methods may be used.

The text region is segmented into rectangular blocks (text region rectangular blocks) to have clusters for respective text paragraphs as blocks. The line region is segmented into rectangular blocks of individual objects (table region rectangular block, line region rectangular block) such as a table, picture, and the like.

The halftone photo region is segmented into rectangular blocks such as an image region rectangular block, background region rectangular block, and the like. Note that information of these rectangular blocks will be referred to as "block segmentation information" hereinafter.

In the block selection processing, block information including an attribute and the like shown in FIG. 8 is generated for each of the rectangular blocks generated in this way.

Referring to FIG. 8, the block information includes an attribute, coordinates X and Y of a position, width W, and height H of each block. Attributes are given as numerical values 1 to 5: "1" indicates a text region rectangular block; "2", a picture region rectangular block; "3", a table region rectangular block; "4", a line region rectangular block; and "5", a photo region rectangular block. The coordinates X and Y indicate the X- and Y-coordinates (those of the upper left corner) of a start point of each rectangular block of the input image, and the width W and height H indicate the width in the X-coordinate direction and the height in the Y-coordinate direction of the rectangular block.

(Step S72 Text Region Determination Processing):

It is checked if each block segmented in step S71 corresponds to a text region. If the block to be processed corresponds to a text region (YES in step S72), the flow advances to step S73 to apply character recognition using a given pattern matching method so as to generate a corresponding character code (character recognition result). On the other hand, if the block to be processed does not correspond to a text region (NO in step S72), the flow advances to step S78.

(Step S73 Character Recognition Result Generation Processing):

Horizontal and vertical projections of pixel values in the text region are calculated to determine horizontal or vertical writing of the text region (to determine the typesetting direction). The distributions of the projections are evaluated. If the distribution of the horizontal projection is larger, horizontal writing is determined; if that of the vertical projection is larger, vertical writing is determined.

Based on the distribution determination result of the horizontal and vertical projections, the typesetting direction is determined to extract lines and to then extract characters, thus obtaining character images. Note that each character size can also be simultaneously detected using the aforementioned horizontal and vertical projections.

For each extracted character image, an observed feature vector obtained by converting the feature obtained from a character image into a several-ten-dimensional numerical value string is generated. Feature vector extraction may use various known methods. For example, the following method may be used. That is, a character is segmented into meshes, lines which form the character in the meshes are counted as direction-dependent line elements, and a vector having dimensions as many as the number of meshes is defined as a feature vector.

The observed feature vector obtained by the aforementioned extraction method is compared with dictionary feature vectors which are calculated for respective character types to calculate distances between these vectors. The calculated distances are evaluated, and a character type with a smallest distance is determined as a recognition result. Note that the character recognition method is not limited to the aforementioned method.

(Step S74 Similarity Determination Processing):

Next, whether or not the similarity of the recognition result is high is determined based on whether or not the shortest distance is equal to or smaller than a predetermined value upon evaluating the distances. If the shortest distance is equal to or larger than the predetermined value (the similarity is low) (NO in step S74), the character image of interest is more likely to be erroneously recognized as another character with a similar shape in the dictionary feature vector. Hence, if the shortest distance is equal to or larger than the predetermined value, the aforementioned recognition result is not adopted, and the flow advances to step S77. On the other hand, if the shortest distance is less than the predetermined value (the similarity is high) (YES in step S74), the recognition result in step S73 is adopted, and the flow advances to step S75.

(Step S75 Font Recognition Processing):

A plurality of dictionary feature vectors as many as character types used in character recognition are prepared in correspondence with character shape types, i.e., font types, and a font type is output together with a character code upon pattern matching, thus recognizing a text font (font information).

(Step S76 Text Vector Data Conversion Processing):

Each character is converted into vector data using outline data prepared in advance in correspondence with the character code and font information obtained by the character recognition result generation processing and the font recognition processing. In case of color image data, a character color is extracted and is recorded together with vector data.

(Step S77 Outline Vector Data Conversion Processing):

A character image is handled as a general line image, and is converted into outline data. That is, as for a character which is more likely to be erroneously recognized, outline vector data which is visually faithful to image data is generated.

With the above processing, image information which belongs to the text region can be converted into vector data which have approximately faithful shapes, sizes, and colors.

(Step S78 Photo Region Determination Processing):

It is checked if the block which is determined in step S72 that it does not correspond to the text region corresponds to a photo region. If that block does not correspond to a photo region (NO in step S78), the flow advances to step S79, and vector conversion different from the text region is applied. On the other hand, if the block corresponds to a photo region (YES in step S78), the photo region does not undergo any vector conversion, and image data is output intact, thus ending the processing.

(Step S79 Vector Conversion Processing of Region Other than Text Region (Outline Vector Data Conversion Processing)):

If it is determined in step S78 that the block of interest corresponds to a region other than the text region and photo region, i.e., a region such as a picture region, line region, table region, or the like, the outlines of black pixel clusters extracted in the block are converted into vector data.

Figure 9:
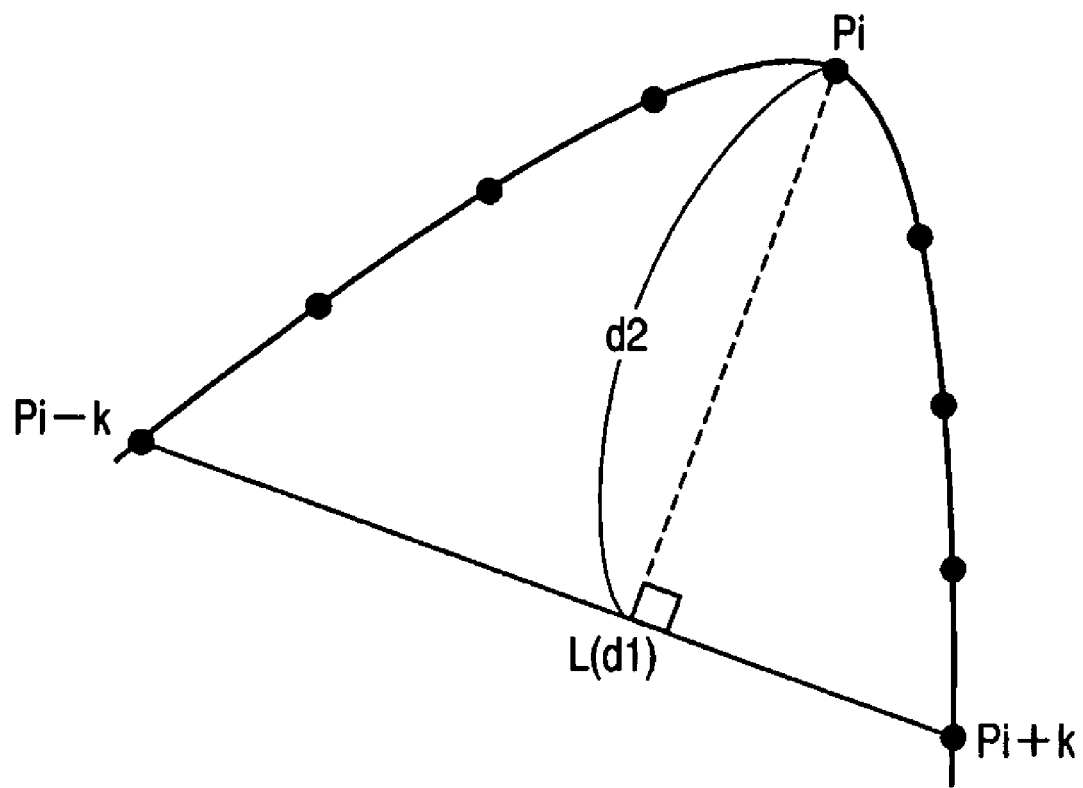
FIG. 9 is a view for explaining vector conversion according to the first embodiment of the present invention.

Vector conversion of a region other than the text region detects a "corner" which segments a curve into a plurality of sections (pixel arrays), so as to express a line image or the like as a combination of straight lines and/or curves. A corner is a point which corresponds to a maximal curvature, and whether or not a pixel Pi on a curve shown in FIG. 9 is a corner is determined as follows.

That is, the pixel Pi is defined as a starting point, and pixels Pi−k and Pi+k which are separated from the pixel Pi by the predetermined number of pixels (k pixels in this case) in two directions along the line image curve are connected by a line segment L. Let d1 be the distance between the pixels Pi−k and Pi+k, d2 be the distance between the line segment L and pixel Pi, and A be the length of an arc between the pixels Pi−k and Pi+k of the curve. If d2 becomes maximal, or if a ratio (d1/A) becomes equal to or smaller than a predetermined threshold, the pixel. Pi is determined as a corner.

Pixel arrays segmented by the corner are approximated by straight lines or curves. Approximation to a straight line is executed by a method of least squares or the like, and that to a curve uses a ternary spline function or the like. The pixel of the corner that segments pixel arrays becomes the start or terminal end of the approximated straight line or curve.

Furthermore, it is checked if an inside outline of a white pixel cluster exists within the vector-converted outline. If such inside outline exists, that outline is vector-converted, and inside outlines of the black and white pixel clusters are recursively vector-converted, taking an inside outline in each inside outline.

As described above, using partial line approximation of an outline, the outline of a picture with an arbitrary shape can be vector-converted. When an original document is a color document, the color of a picture is extracted from the color image, and is stored together with vector data.

Figure 10:
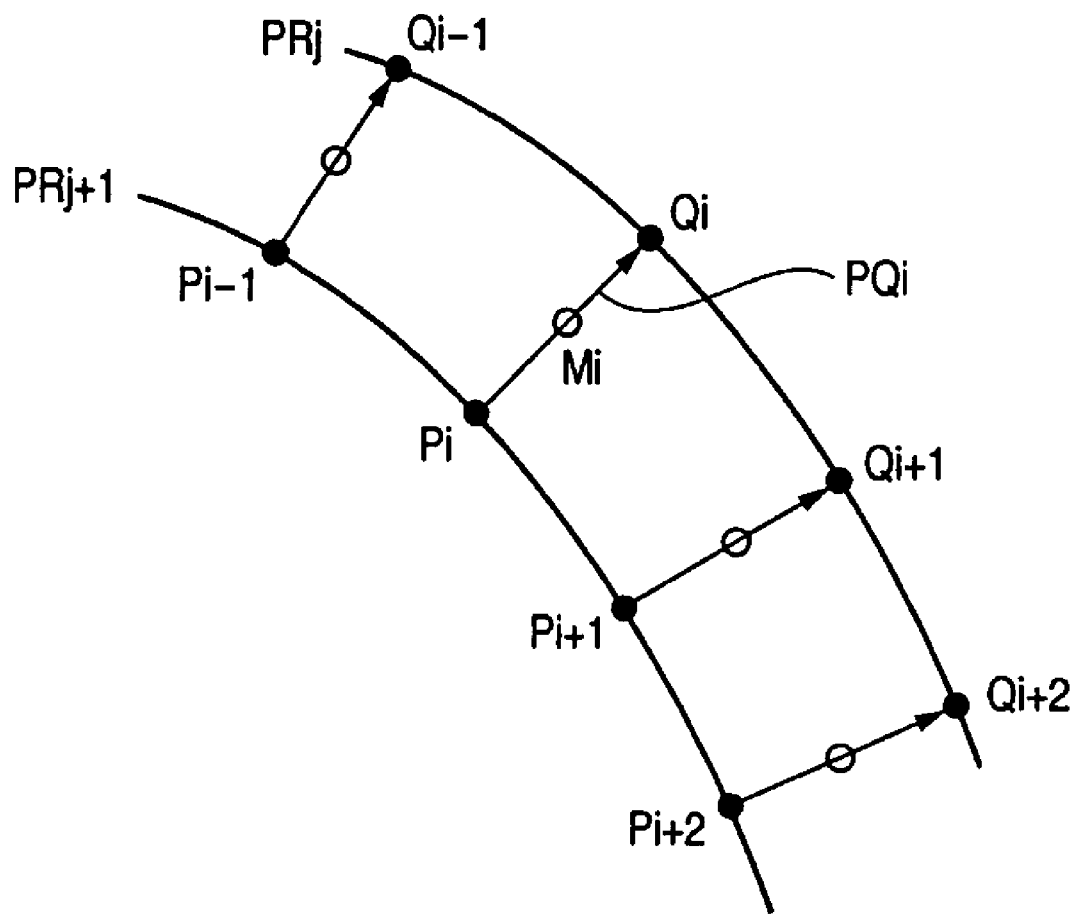
FIG. 10 is a view for explaining vector conversion according to the first embodiment of the present invention.

As shown in FIG. 10, when an outside outline PRj is close to an inside outline PRj+1 or another outside outline within a section of interest, two or three or more outlines are combined to express a line having a given width.

For example, distances PQn (n=i−1, i, i+1, i+2, and so on) between pixels Pn on the outline PRJ+1 and pixels Qn on the outline PRj which have shortest distances from the pixels Pn are calculated. When variations of the distances PQn (n=i−1, i, i+1, i+2, and so on) are slight, the section of interest can be approximated by a straight line or curve along a point sequence of middle points Mn between the pixels Pn and Qn. The width of the approximated straight line or curve is set to be the average value of the distances PQn (n=i−1, i, i+1, i+2, and so on).

A line or a table ruled line as a set of lines can be efficiently vector-converted by expressing them as a set of lines having a width.

Upon completion of the processes for respective regions in steps S76, S77, and S79, the vector image data after vector conversion of the raster image data in FIG. 6 has a configuration including the same description as that of the vector image data shown in FIG. 5. In this way, the data size can be reduced, and deterioration of the image quality can be prevented.

As described above, according to the first embodiment, the raster image data expression (text and line image parts in the image region) included in the input vector image data is vector-converted, thus reducing its data size. In this manner, the system resources required to manage image data received as the vector image data including the raster image data expression can be efficiently used.

Second Embodiment

In the first embodiment, the MFP receives image data of various data formats (data configurations), generated by, for example, an image processing application on an external device, via the network. After that, data conversion of the raster/vector conversion processing is executed based on the contents of the received data. However, the present invention is not limited to this.

For example, in terms of a reduction of the traffic on the network, a printer driver on a terminal (external device) such as a PC or the like, which serves as an interface with the MFP, may incorporate a raster/vector conversion unit corresponding to the raster/vector conversion unit 14.

That is, based on image data to be transmitted to the MFP, the raster/vector conversion processing is applied to that image data on the external device, and the obtained vector image data is transmitted to the MFP.

In this manner, in data transfer between the external device and MFP via the network, vector image data need only be transferred, thus reducing the traffic on the network compared to transfer of raster image data.

An example of the arrangement in such case will be described using FIG. 11.

[Apparatus Overview of MFP]

Figure 11:
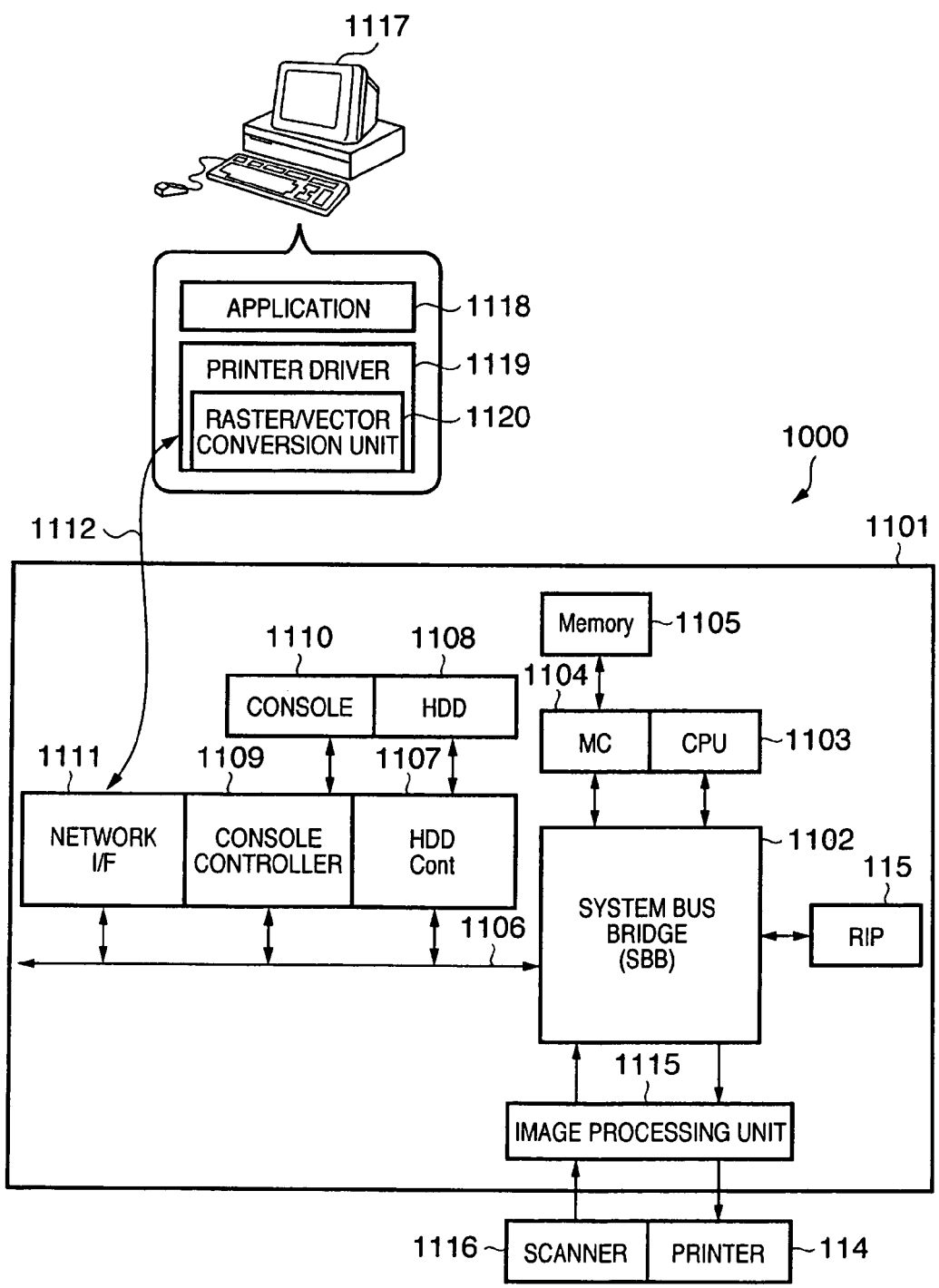
FIG. 11 is a block diagram showing the arrangement of an image processing system according to the second embodiment of the present invention.

FIG. 11 is a block diagram showing the arrangement of an image processing system according to the second embodiment of the present invention.

Since various building components 1102 to 1112 and 1115 to 1117 which are included in or connected to a controller 1101 in FIG. 11 respectively correspond to various building components 2 to 12 and 15 to 17 which are included in or connected to the controller 1 in FIG. 1, a detailed description thereof will be omitted.

Referring to FIG. 11, a PC 1117 is connected onto a network 1112 to which an MFP 1000 is connected. The PC 1117 includes an application 1118 and a printer driver 1119 which run on an OS program of the PC 1117.

The printer driver 1119 comprises a raster/vector conversion unit 1120 corresponding to the raster/vector conversion unit 14 of the first embodiment. Image data generated by the application 1118 is converted into a standard picture interface in the PC 1117, which is transferred to the printer driver 1119. As the application, there are various applications such as an application which passes vector image data that does not include any raster image data to the printer driver, an application which passes vector image data that includes a raster image data expression to the printer driver, and so forth. The printer driver 1119 interprets the received image data, and the raster/vector conversion unit 1120 converts a raster image data part in the image data received from the application 1118 into vector image data. After that, the printer driver 1119 outputs the converted image data onto the network 1112.

As described above, according to the second embodiment, the driver incorporated in the external device connected to the MFP 1000 implements the raster/vector conversion unit. In this way, the data size of image data to be transferred between the external device and MFP via the network can be reduced.

As a result, the system resources of the entire system including the external device and MFP can be efficiently used.

Since the MFP side can always receive vector image data that has undergone optimal vector conversion processing upon receiving image data from the external device via the network, the system resources in the MFP can be efficiently used.

Third Embodiment

In the first and second embodiments, the raster image data part in the image data to be processed is always converted into vector image data. However, a given application as a generation source of that image data to be processed may generate a raw raster image optimal to an output device (e.g., a printer or the like) as an output destination, and may transfer it to the MFP.

In such case, even when the raster image data is vector-converted to generate vector image data, when that vector image data is returned to raster image data by an image data rasterization unit, its data values may be different from those of the original raster image data before conversion.

For this reason, when the user does not want such processing contents, or when the data values of the original raster image data may be different from those of raster image data after rasterization by the image data rasterization unit, the next mode may be provided in addition to the vector conversion mode that executes vector conversion. That is, a mode that can output original raster image data if it has a large data size (vector conversion inhibition mode) may be provided, and the modes may be switched for different purposes.

In the first embodiment, mode switching is implemented by an operation from, e.g., the console 10. In the second embodiment, mode switching is implemented by an operation on, e.g., the setting widow of the printer driver, which is displayed on the PC.

As described above, according to the third embodiment, as whether or not raster image data is converted into vector image data can be arbitrarily designated by the operator of the system or the external device, a more suitable image output environment intended by the user can be provided.

Fourth Embodiment

In the first embodiment, the raster/vector conversion unit applies data conversion based on the raster/vector conversion processing to the input raster image data. However, the present invention is not limited to this.

The fourth embodiment will explain the following arrangement. That is, for example, a raster/vector conversion unit is connected to the image data rasterization unit to apply raster/vector conversion to raster image data which is temporarily rasterized upon rendering, thus reducing the data size to be processed.

[Apparatus Overview of MFP]

Figure 12:
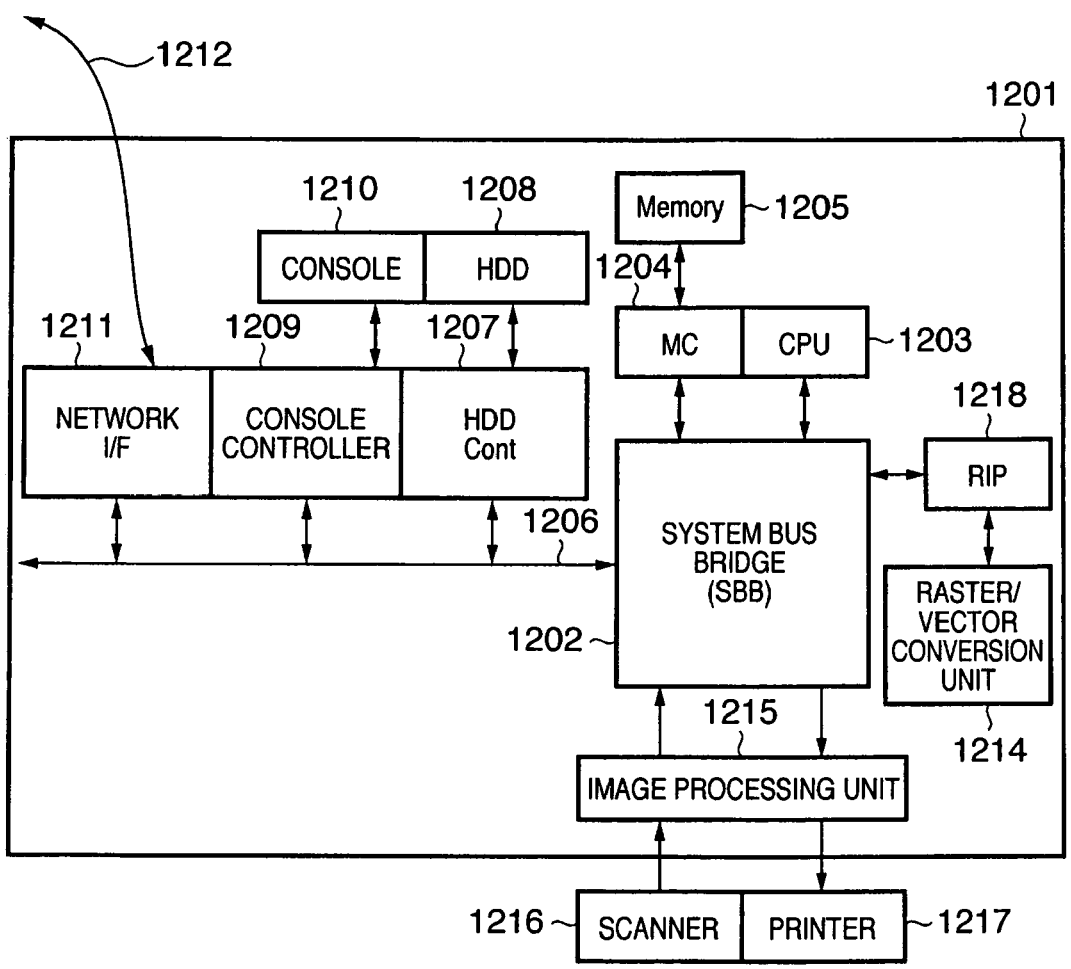
FIG. 12 is a block diagram showing the arrangement of an image processing system according to the fourth embodiment of the present invention.

FIG. 12 is a block diagram showing the arrangement of an image processing system according to the second embodiment of the present invention.

Since various building components 1202 to 1212 and 1214 to 1217 which are included in or connected to a controller 1201 in FIG. 12 respectively correspond to various building components 2 to 12 and 14 to 17 which are included in or connected to the controller 1 in FIG. 1, a detailed description thereof will be omitted.

The difference between the first and fourth embodiments is as follows. In the first embodiment, the raster/vector conversion unit 14 is connected to the system bus bridge 2. In the fourth embodiment, a corresponding raster/vector conversion unit 1214 is connected to an image data rasterization unit 1218.

Note that the arrangement of the fourth embodiment assumes a case wherein vector image data is received from the network. However, assuming that vector image data including a raster image data expression is received like in the first embodiment, the arrangement of the first embodiment shown in FIG. 1, and that of the fourth embodiment shown in FIG. 12 may be combined. In this case, both the raster/vector conversion unit 14 in FIG. 1 and the raster/vector conversion unit 1214 in FIG. 12 exist in the MFP.

[Conventional Fallback]

The output flow of vector image data transferred from the network is as has been explained in the first embodiment. Processing called fallback which is generated upon generation of intermediate language data called DL data in that flow will be described below.

DL data is generated to have a so-called layer structure by writing objects in independent planes. The concept upon expression of document data using DL data contrast to the document data described by vector image data, as shown in FIG. 4, will be described using FIG. 13.

Figure 13:
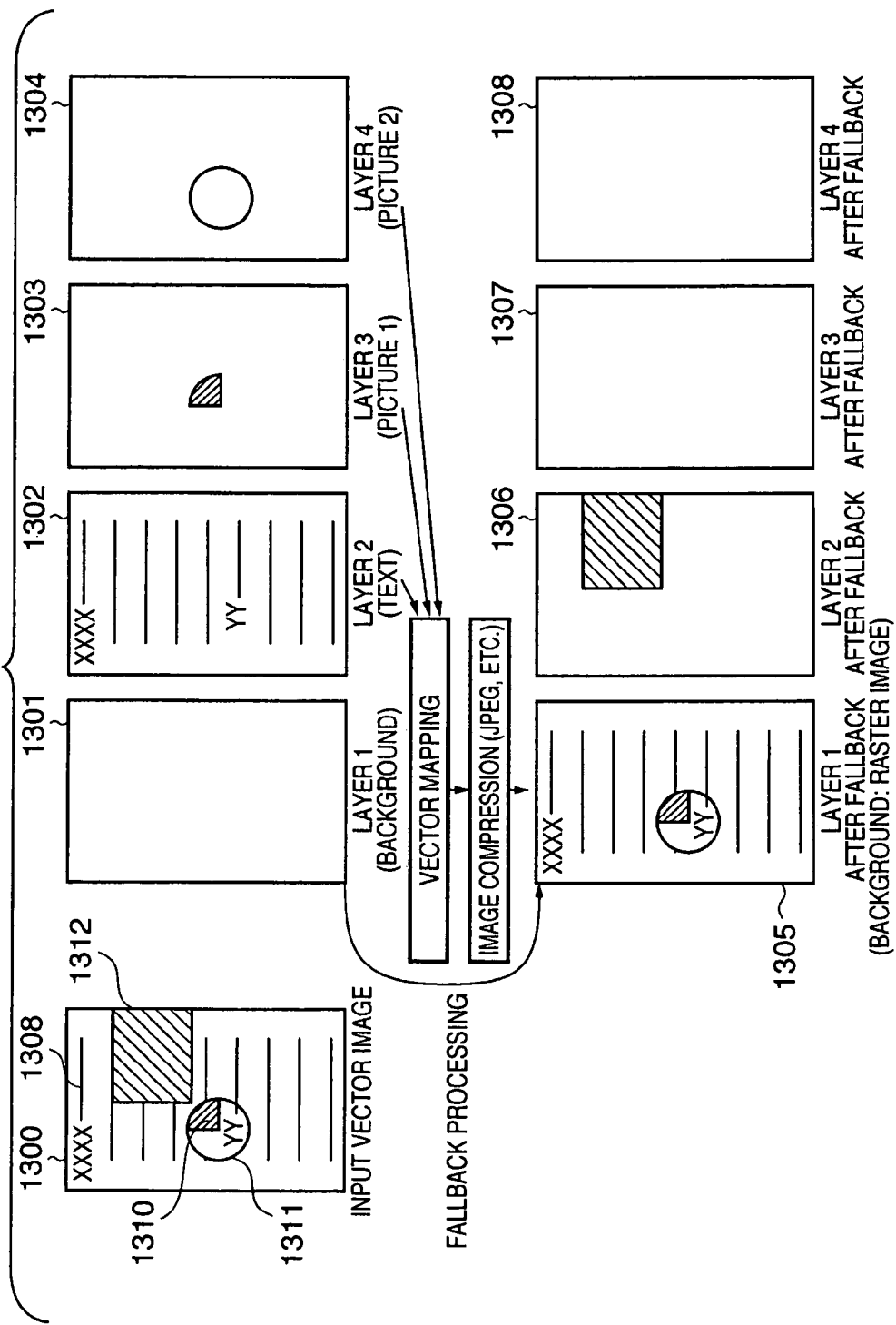
FIG. 13 is a view for explaining conventional fallback processing.

FIG. 13 is a view for explaining the conventional fallback processing.

Reference numeral 1300 denotes vector image data received from a network 1212. The contents of the vector image data 1300 are interpreted by a CPU 1203 to recognize objects 1309 to 1312, and DL data of respective objects are stored in independent layers assured in a system memory 1205.

Normally, since a background layer is prepared, a background is stored in a layer 1301, and the objects 1309 to 1311 are respectively stored in layers 1302 to 1304. Since the vector image data 1300 has no background, the layer 1301 in this case is empty.

Upon executing such DL data generation, if a maximum of four layers can only be prepared due to system limitations (memory size or the number of layers that can be controlled), no DL data of the object 1312 can be generated. In such case, after the objects 1301 to 1304 are transferred to the image data rasterization unit 1218 as an image for one page, and temporarily undergo rasterization, the rasterized image data is written back to the layer 1301 as a background image.

After rasterization, since a memory size required as an image data size increases, the image data undergoes lossy compression using an image compression format such as JPEG or the like to fall within the area of layer 1 of the system memory 1205. Such processing is called fallback processing. After the fallback processing, the layers 1302 to 1304 become empty layers 1306 to 1308.

In this way, since the empty layers 1306 to 1308 are obtained after the fallback processing, the non-processed (non-stored), remaining object of the vector image data 1300 can be stored in the layer 1306.

The layers 1305 to 1308 in FIG. 13 indicate a state wherein the objects are stored after the fallback processing.

[Fallback Processing Including Vector Conversion]

In the conventional fallback processing, objects described using character codes or functions are rasterized and their data are compressed as needed. For this reason, smoothness of a picture in an object and image quality of a thin line part of text are lost. On the other hand, since the compression processing is repetitively applied by increasing the compression ratio if the data size is large, performance is also worsened.

Hence, in the fourth embodiment, in order to avoid such situation, fallback processing including vector conversion is executed. This processing will be described below using FIG. 14.

Figure 14:
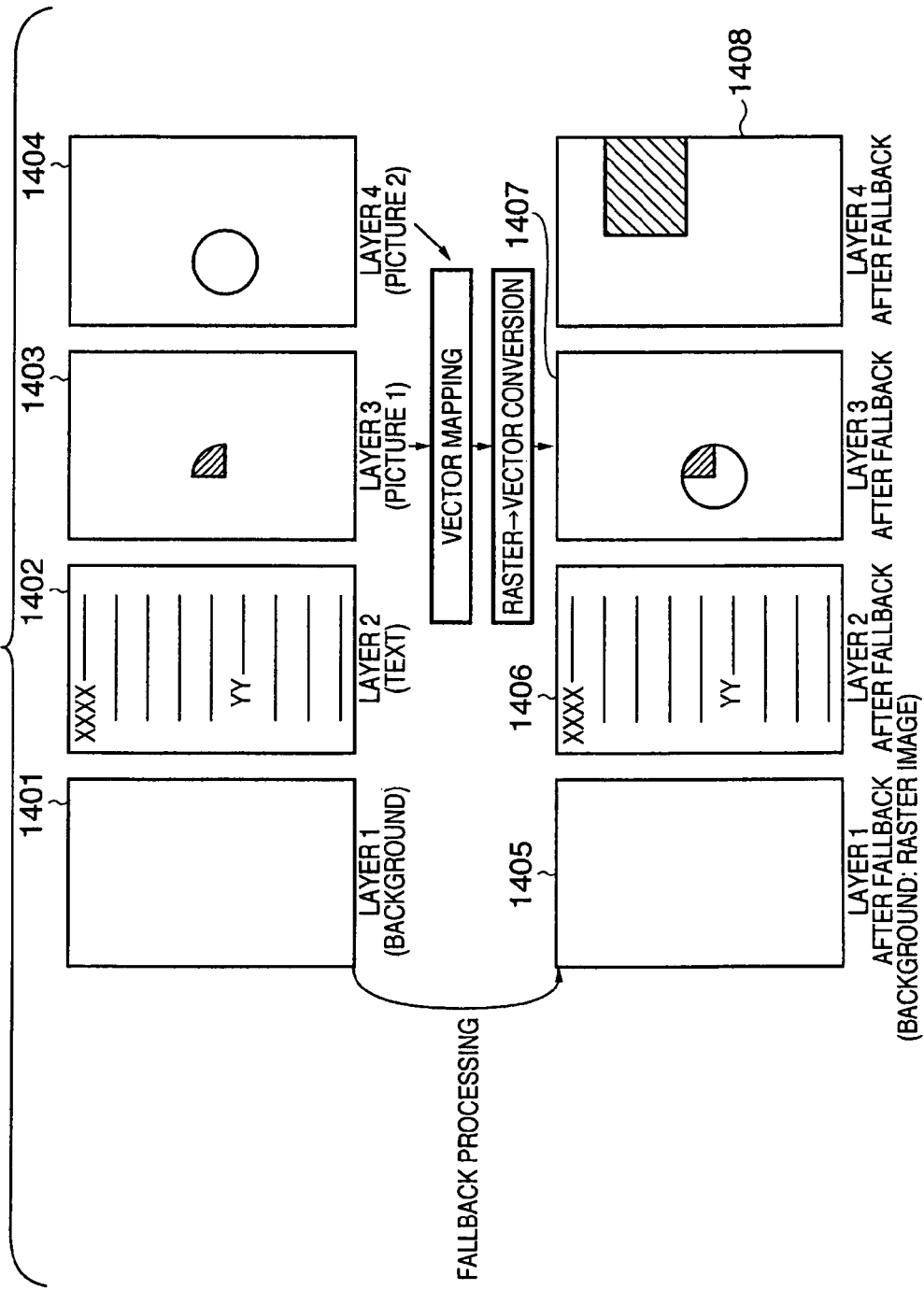
FIG. 14 is a view for explaining fallback processing including raster/vector conversion processing according to the fourth embodiment of the present invention.

FIG. 14 is a view for explaining fallback processing including raster/vector conversion processing according to the fourth embodiment of the present invention.

An input image is the vector image data 1300 as in FIG. 13, and some of DL data of objects based on this input image are mapped on layers 1401 to 1404 in the same manner as in the conventional fallback processing.

In the conventional fallback processing, in order to store the object 1312, that object is converted into raster image data by the fallback processing, and the raster image data is compressed, so that the compressed raster image data is saved in the background layer.

By contrast, in the fourth embodiment, some (for example, objects having an identical attribute (block information)) of the rasterized raster image data is transferred from the image data rasterization unit 1218 to the raster/vector conversion unit 1214 to apply vector conversion to the rasterized raster image data again.

In the example of FIG. 14, the objects 1310 and 1311, which are stored in layers 3 and 4 and have a picture attribute, undergo re-vector conversion after rasterization. The data obtained by the re-vector conversion is stored in layer 3.

As a result, a layer 1404 becomes an empty layer after the fallback processing, and DL data of the object 1312 can be stored in this empty layer.

In this manner, after the fallback processing of the fourth embodiment, the object 1312 is stored in a layer 1408, and generation of all DL data of the objects in the vector image data 1300 can be executed.

Especially, in the fourth embodiment, the object 1309 having a text attribute is stored in one layer as DL data corresponding to the text object. Also, the objects 1310 and 1311 as objects having a picture attribute are stored in one layer as DL data of the composited picture object. Since no JPEG compression is required, an increase in data size and deterioration of image data of DL data stored in layers can be prevented.

Another example will be described below.

FIG. 15 is a view for explaining fallback processing of vector image data 1500 having a rectangular picture bounded by the dotted line.

The overall processing flow is the same as that in FIG. 14. However, when a generation source application that generates the vector image data 1500 describes the dotted line, which forms a rectangular object 1509, as one object, the conventional fallback processing maps only some of DL data of the objects on layers 1502 to 1504.

By contrast, the fourth embodiment executes fallback processing for storing DL data of objects having an identical attribute in a single layer. That is, DL data of the object 1509 can be generated and stored using the configuration of layers 1505 to 1508 with respect to states of layers 1501 to 1504. As a result, the system resources required to manage objects can be dramatically reduced without deteriorating the image quality of objects.

As described above, according to the fourth embodiment, during generation of intermediate data from vector image data in the MFP, that intermediate data is temporarily converted into raster image data. Based on that raster image data, vector image data is re-generated. In this way, limitations on the system resources required to manage intermediate data can be relaxed.

Fifth Embodiment

An application or the operator of that application can recognize the type of vector image data transferred from a generation source application that generates vector image data in many cases. In such cases, whether or not raster/vector conversion is to be applied may be designated on the application.

For example, in case of image data generated by pasting landscape image data sensed by a digital camera to data created by a document generation application, even when raster/vector conversion is applied to the pasted landscape image data, a raster image is more likely to remain as a photo region.

In such case, information that indicates no execution (or inhibition) of raster/vector conversion is embedded in the vector image data by the application and is output, or the application and system negotiate with each other. In this manner, it can be set not to apply raster/vector conversion to vector image data to be processed.

On the contrary, when a character is embedded as a suffix in data generated by an image edit application, the application may often paste it as an image. In such case, in order to apply raster/vector conversion to only a region of the pasted suffix, the application may explicitly designate the region to be processed.

Note that the image processing system according to the present invention is not limited to those shown in FIGS. 1, 11, and 12, and may be implemented using various devices such as a dedicated image processing device, general-purpose computer, and the like.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2005-134525, filed May 2, 2005, which is hereby incorporated by reference herein in its entirety.

What is claimed is:

1. An image processing apparatus comprising:
an input unit to input first vector image data;
a determination unit to determine whether or not the first vector image data includes both (i) a raster image data expression part and (ii) a third vector image data part, wherein the third vector image data part is not raster image data;
an extracting unit to extract, when said determination unit determines that the first vector image data includes both the raster image data expression part and the third vector image data part, the raster image data expression part from the first vector image data;
a segmenting unit to segment the raster image data expression part extracted by the extracting unit into regions of respective attributes, wherein said segmenting unit does not segment the third vector image data part;
a conversion unit to convert the segmented regions having a predetermined attribute into second vector image data, wherein the conversion unit does not convert the segmented regions not having the predetermined attribute; and
a storing unit to store the second vector image data instead of the segmented region of the raster image data expression part having the predetermined attribute into a memory when said determination unit determines that the first vector image data includes both the raster image data expression part and the third vector image data part, and to store the first vector image data into the memory when said determination unit determines that the first vector image data does not include the raster image data expression part.

2. The apparatus according to claim 1, further comprising:
a rasterization unit to rasterize data stored in said memory into raster image data; and
an output unit to output the raster image data rasterized by said rasterization unit to an image output unit.

3. An apparatus comprising:
a driver functioning as an input unit, a determination unit, an extracting unit, a segmenting unit, and a conversion unit,
wherein said input unit inputs first vector image data from an application,
wherein said determination unit determines whether or not the first vector image data includes both (i) a raster image data expression part and (ii) a third vector image data part,
wherein said extracting unit extracts, when said determination unit determines that the first vector image data includes both the raster image data expression part and the third vector image data part, the raster image data expression part from the first vector image data,
wherein said segmenting unit segments the raster image data expression part extracted by the extracting unit into regions of respective attributes,
wherein said conversion unit converts the segmented regions having a predetermined attribute into the second vector image data, and
wherein said storing unit stores the second vector image data instead of the segmented region having the predetermined attribute into a memory of an external image processing apparatus when said determination unit determines that the first vector image data includes both the raster image data expression part and the third vector image data part, and stores the first vector image data into the memory of the external image processing apparatus when said determination unit determines that the first vector image data does not include the raster image data expression part.

4. The apparatus according to claim 1, wherein said input unit inputs the first vector image data received from an external device via a network.

5. The apparatus according to claim 1, further comprising:
an intermediate data generator to generate intermediate data required to generate raster image data for respective objects which form the data stored by said storing unit;
a rasterization unit to, when a storage area required to temporarily store intermediate data generated by said intermediate data generation unit in a storage unit cannot be assured, rasterizing already generated intermediate data stored in the storage unit to raster image data;
a second conversion unit to convert the raster image data rasterized by said rasterization unit into vector image data; and
a control unit to control said intermediate data generation unit to generate intermediate data of the vector image data converted by said second conversion unit, and controlling the storage unit to store the generated intermediate data of the vector image data converted by said second conversion unit in place of the already generated intermediate data.

6. The apparatus according to claim 5, wherein said rasterization unit rasterizes intermediate data having an identical attribute of the already generated intermediate data, stored in the storage unit, into raster image data.

7. The apparatus according to claim 1, further comprising:
a designation unit to designate whether or not a raster image data expression part included in vector image data to be processed is to be converted into vector image data.

8. An image processing apparatus, comprising:
an input unit to input vector image data, the vector image data including a plurality of objects;
an intermediate data generation unit to generate intermediate data for each of the objects in order, the intermediate data being required to generate raster image data;
a storing unit to store the generated intermediate data in order into a memory;
a rasterization unit to, when a storage capacity of the memory has become insufficient for storing the intermediate data generated by said intermediate data generation unit, rasterize a portion of the intermediate data stored in the memory to raster image data;
a conversion unit to convert the raster image data rasterized by said rasterization unit into vector image data, and to store the converted vector image data into the memory for replacing the portion of the intermediate data which has been rasterized by said rasterization unit; and
a control unit to control, after the converted vector image data is stored into the memory to replace the at least some of the intermediate data, said intermediate data generation unit to generate intermediate data of the remaining objects and control the storage unit to store the generated intermediate data of the remaining objects in the memory.

9. The apparatus according to claim 8, wherein said rasterization unit rasterizes intermediate data having an identical attribute of the already generated intermediate data, stored in the storage unit, into raster image data.

10. A method of controlling an image processing apparatus, the method comprising:
an input step of inputting first vector image data;
a determination step of, whether or not the first vector image data includes both (i) a raster image data expression part and (ii) a third vector image data part, wherein the third vector image data part is not raster image data;
an extracting step of extracting, when a determination is made by said determining that the first vector image data includes both the raster image data expression part and the third vector image data part, the raster image data expression part from the first vector image data;
a segmenting step of segmenting the raster image data expression part extracted by the extracting step into regions of respective attributes, wherein said segmenting does not segment the third vector image data part;
a conversion step of converting the segmented regions having a predetermined attribute into second vector image data, wherein the conversion step does not convert the segmented regions not having the predetermined attribute; and
a storing step of storing the second vector image data instead of the segmented region of the raster image data expression part having the predetermined attribute into a memory when said determination unit determines that the first vector image data includes both the raster image data expression part and the third vector image data part, and storing the first vector image data into the memory when said determination unit determines that the first vector image data does not include the raster image data expression part.

11. A method of controlling an image processing apparatus, the method comprising:
an input step of inputting vector image data, the vector image data including a plurality of objects;
an intermediate data generation step of generating intermediate data for each of the objects in order, the intermediate data being required to generate raster image data;
a storing step of storing the generated intermediate data in order into a memory;
a rasterization step of rasterizing, when a storage capacity of the memory has become insufficient for storing the intermediate data generated by said intermediate data generation step, a portion of the intermediate data stored in the memory to raster image data;
a conversion step of converting the raster image data rasterized in the rasterization step into vector image data, and of storing the converted vector image data into the memory to replace the portion of the intermediate data which has been rasterized by said rasterization step; and
a control step of controlling, after the converted vector image data is stored into the memory to replace the portion of the intermediate data, the generating of intermediate data of the remaining objects and controlling the storing of the generated intermediate data of the remaining objects in the memory.

12. A non-transitory computer-readable medium having stored thereon sequences of instructions, the sequences of instructions including instructions which when executed by a computer system causes the computer system to perform:
an input step of inputting first vector image data;
a determination step of determining whether or not the first vector image data includes both (i) a raster image data expression part and (ii) a third vector image data part, wherein the third vector image data part is not raster image data;
an extracting step of extracting, when a determination is made by said determining that the first vector image data includes both the raster image data expression part and the third vector image data part, the raster image data expression part from the first vector image data;
a segmenting step of segmenting the raster image data expression part extracted by the extracting step into regions of respective attributes, wherein said segmenting does not segment the third vector image data part;
a conversion step of converting the segmented regions having a predetermined attribute into second vector image data, wherein the conversion step does not convert the segmented regions not having the predetermined attribute; and
a storing step of storing the second vector image data instead of the segmented region of the raster image data expression part having the predetermined attribute into a memory when said determination step determines that the first vector image data includes both the raster image data expression part and the third vector image data part, and storing the first vector image data into the memory when said determination step determines that the first vector image data does not include the raster image data expression part.

13. A non-transitory computer-readable medium having stored thereon sequences of instructions, the sequences of instructions including instructions which when executed by a computer system causes the computer system to perform:
- an input step of inputting vector image data, the vector image data including a plurality of objects;
- an intermediate data generation step of generating intermediate data for each of the objects in order, the intermediate data being required to generate raster image data;
- a storing step of storing the generated intermediate data in order into a memory;
- a rasterization step of rasterizing, when a storage capacity of the memory has become insufficient for storing the intermediate data generated by said intermediate generation step, a portion of the intermediate data stored in the memory to raster image data;
- a conversion step of converting the raster image data rasterized in the rasterization step into vector image data, and of storing the converted vector image data into the memory to replace the portion of the intermediate data which has been rasterized by said rasterization step; and
- a control step of controlling, after the converted vector image data is stored into the memory to replace the portion of the intermediate data, the generating of intermediate data of the remaining objects and controlling storing of the generated intermediate data of the remaining objects in the memory.

* * * * *